(12) United States Patent
Yoshikawa et al.

(10) Patent No.: US 7,493,928 B2
(45) Date of Patent: Feb. 24, 2009

(54) HEAVY DUTY TIRE

(75) Inventors: Hideaki Yoshikawa, Kobe (JP); Kiyoto Maruoka, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 135 days.

(21) Appl. No.: 11/340,713

(22) Filed: Jan. 27, 2006

(65) Prior Publication Data

US 2006/0207710 A1   Sep. 21, 2006

(30) Foreign Application Priority Data

Mar. 15, 2005   (JP) .............................. 2005-073620

(51) Int. Cl.
*B60C 15/00* (2006.01)
*B60C 15/04* (2006.01)

(52) U.S. Cl. ....................... 152/539; 152/540; 152/552; 152/554; 245/1.5

(58) Field of Classification Search ................. 152/539, 152/540, 541, 547, 552, 554; 245/1.5
See application file for complete search history.

(56) References Cited

U.S. PATENT DOCUMENTS

| | | | | |
|---|---|---|---|---|
| 4,180,116 A | * | 12/1979 | Maiocchi | 152/540 |
| 4,215,737 A | * | 8/1980 | Motomura et al. | 152/541 |
| 6,736,177 B2 | * | 5/2004 | Ueyoko | 152/539 |
| 2004/0123927 A1 | * | 7/2004 | Ueyoko et al. | 152/451 |

FOREIGN PATENT DOCUMENTS

| | | | |
|---|---|---|---|
| EP | 615867 | * | 9/1994 |
| JP | 08020208 | * | 1/1996 |
| JP | 11-321244 A | | 11/1999 |
| JP | 2000016034 | * | 1/2000 |
| JP | 2001191754 | * | 7/2001 |
| JP | 2002-59716 A | | 2/2002 |
| JP | 2003226117 | * | 8/2003 |

* cited by examiner

*Primary Examiner*—Justin Fischer
(74) *Attorney, Agent, or Firm*—Birch, Stewart, Kolasch & Birch, LLP

(57) ABSTRACT

A heavy duty tire comprises a tread portion, a pair of sidewall portions, a pair of bead portions each with a bead core therein, the bead core with an aspect ratio (HC1/WC) of from 0.43 to 0.58, and a carcass comprising a carcass ply of cords extending between the bead portions and turned up around a bead core in each bead portion from the inside to outside of the tire so as to form a pair of turnup portions and a main portion therebetween, the turnup portion comprising a turnup mainpart extending along an axially inner surface, a radially inner surface and an axially outer surface of the bead core smoothly, and a turnup sub-part extending from the turnup main-part toward the main portion near the radially outer surface of the bead core.

10 Claims, 10 Drawing Sheets

PRIOR ART

PRIOR ART

HEAVY DUTY TIRE

BACKGROUND OF THE INVENTION

1. Field of the Invention

The present invention relates to a heavy duty tire which can reduce deformation of the bead portion caused by the increase in usable years.

2. Description of the Prior Art

In FIG. 11, there is shown a structure of a bead portion of a conventional heavy duty tire. The bead portion comprises a carcass ply "a" including a main portion a1 and a pair of turnup portions a2 each wound around a bead core b.

In such a structure, since an outer end a2e of the turnup portion "a2" is positioned near a radially outer surface of the bead core b, a stress applied to the end a2e of the turnup portion at a time when the bead portion is deformed is small. Accordingly, it is possible to prevent some damages such as a loose from the end a2e or the like.

However, in such a bead structure, a large moment M around the center b1 of the cross section of the bead core b tends to be generated by tension F of the carcass cords. The moment M applied into the bead core b makes the bead portion deform such that a toe "c" thereof is lifted from a rim seat (not shown).

The deformation of the bead portion becomes large by the increase of usable years and generates a gap between the toe "c" of the bead portion and the rim with this, when an used tire (including a re-tread tire) is remounted on the rim, it is hard to inflate the tire, since the air to be filled in the tire tends to leak through the gap.

SUMMARY OF THE INVENTION

It is, therefore, a main object of the present invention to provide a heavy duty tire which can maintain a contact enough between the bead portion and the rim by preventing a deformation of the bead portion caused by the increase in usable years.

According to the present invention, a heavy duty tire comprises:

a tread portion;
a pair of sidewall portions;
a pair of bead portions each having a bead core therein, the bead core having an aspect ratio (HC1/WC) of the maximum thickness HC1 to the maximum width WC of from 0.43 to 0.58; and
a carcass comprising
  a carcass ply of cords extending between the bead portions and turned up around the bead core in each bead portion from the inside to outside of the tire so as to form a pair of turnup portions and a main portion therebetween, the turnup portion comprising
  a turnup main-part extending along an axially inner surface, a radially inner surface and an axially outer surface of the bead core smoothly, and
  a turnup sub-part extending from the turnup main-part toward the main portion near the radially outer surface of the bead core.

DETAILED DESCRIPTION OF THE INVENTION

A description will be given of an embodiment in accordance with the present invention with reference to the accompanying drawings.

In this specification, when there is no reference in particular, the dimensions of each part of a tire are the values measured in a "state of 50 kPa internal pressure" when the tire is mounted on a standard rim and inflated by 50 kPa, but loaded with no tire load. Here, the standard rim is the "standard rim" specified in JATMA, the "Measuring Rim" in ETRTO, the "Design Rim" in TRA or the like.

Figure 1:
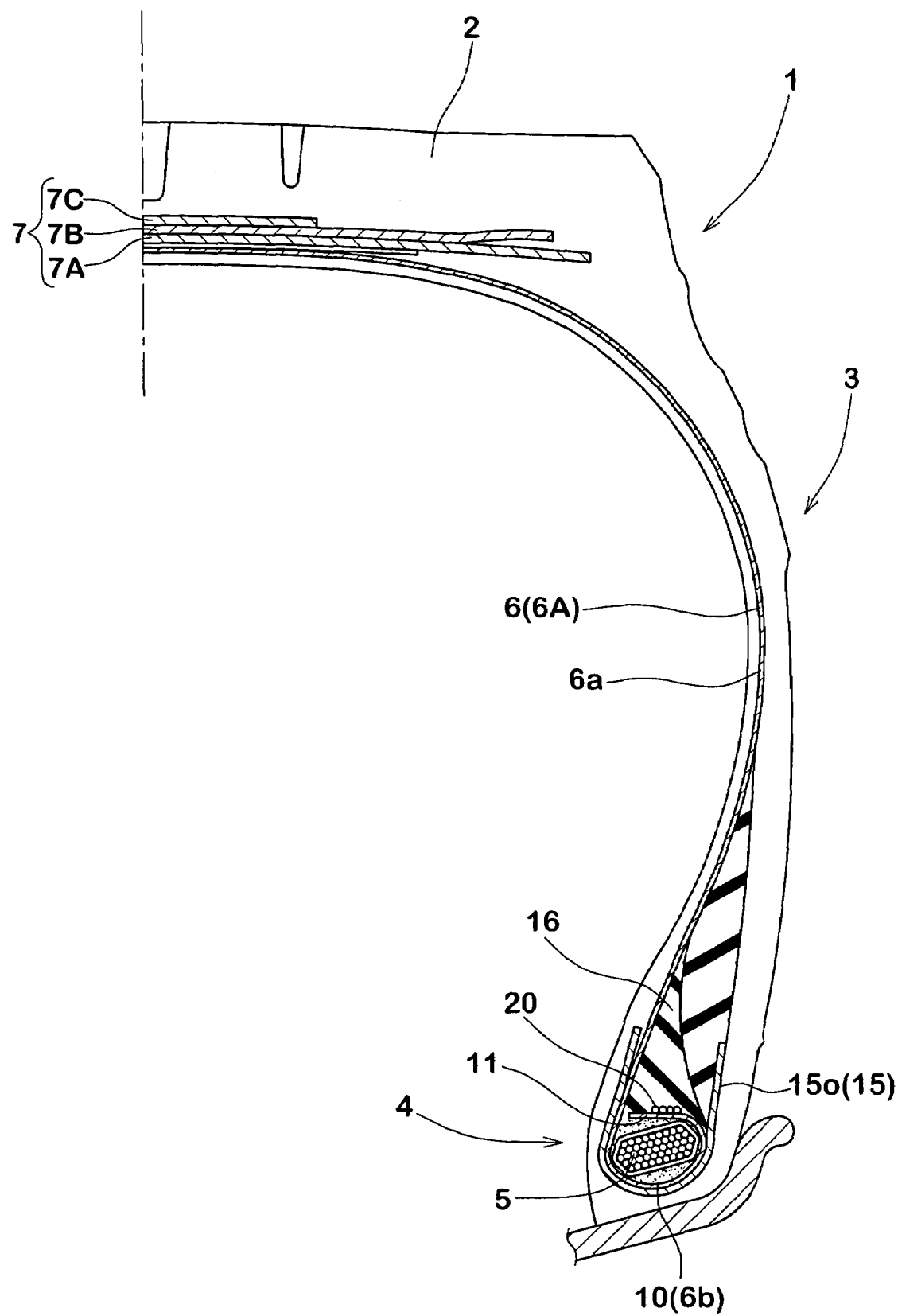
FIG. 1 is a cross sectional view of an embodiment of a heavy duty tire in accordance with the present invention.

In FIG. 1, the heavy duty tire 1 comprises a tread portion 2; a pair of side wall portions 3; a pair of bead portions 4 each with a bead core 5 therein; a carcass 6 extending between the bead portions 4; and a belt 7 disposed radially outside the carcass 6 in the tread portion 2.

The belt 7 comprises at least two, preferably three or more belt plies of belt cords. In this present embodiment, the belt 7 comprises a first belt ply 7A disposed radially innermost and having belt cords laid at an angle of 60 plus minus 15 degrees with respect to the tire equator C, and second and third belt plies 7B and 7C having belt cords laid at an angle of from 10 to 35 degrees with respect to the tire equator C. At least two belt plies are arranged at the direction such that the belt cords of each ply intersect. As the belt cord, a high elastic cord such as a steel cord is desirable.

The carcass 6 comprises one carcass ply 6A of cords, and extending between the bead portions 4 through the tread portion 2 and the sidewall portions 3, and turned up around the bead cores 5 from the axially inside to outside of the tire, so as to form a pair of turnup portions 6b and a main portion 6a therebetween.

The main portion has the cords arranged radially at an angle of 80 to 90 degrees with respect to a circumferential direction of the tire.

For the carcass cord, a steel cord are preferably used, but an organic fiber cord such as a nylon, a rayon, a polyester, an aromatic polyamide and the like can be used.

Figure 3:
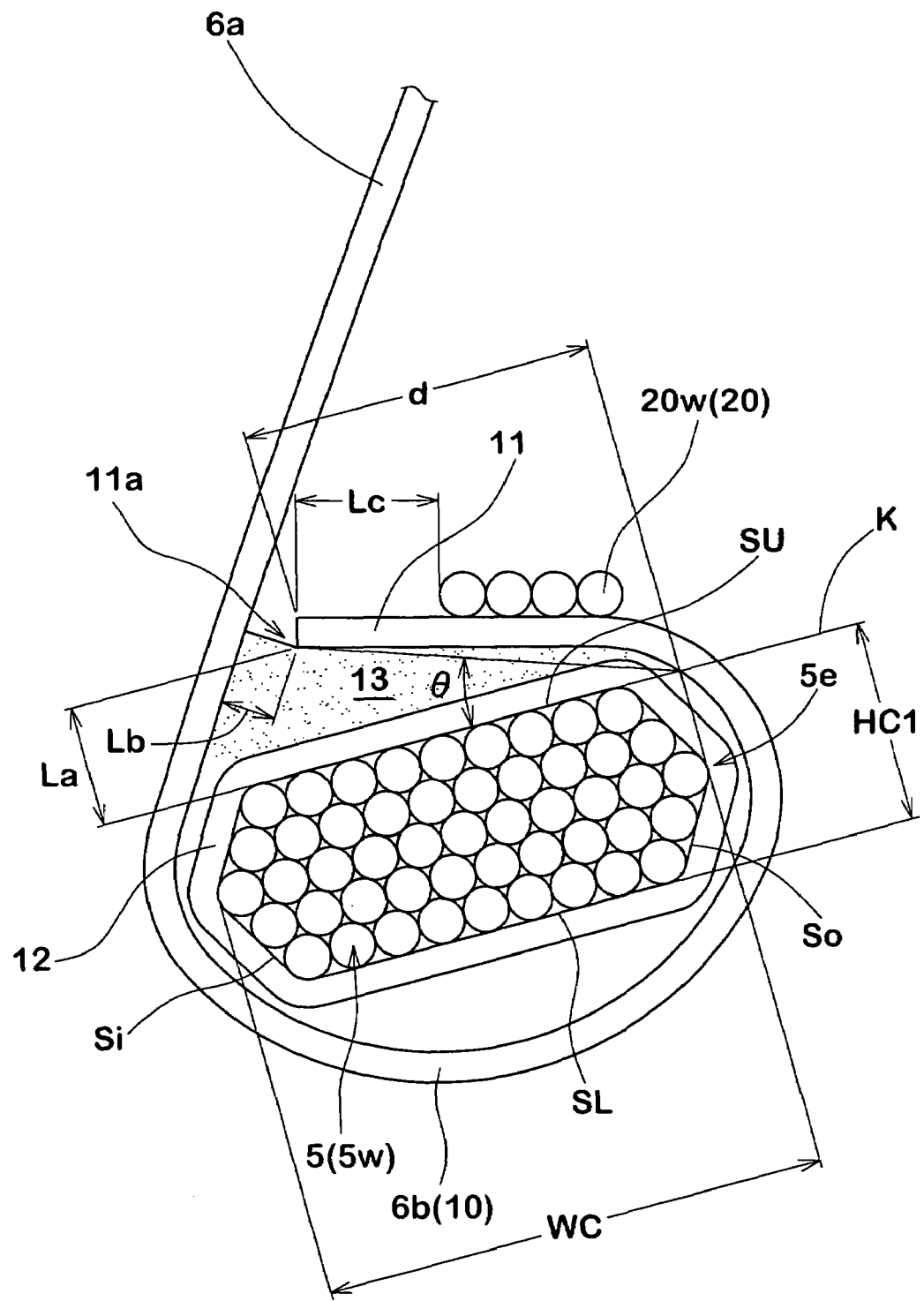
FIG. 3 is an enlarged view of FIG. 2.

The bead core 5 is formed by winding a bead wire 5w predetermined times in a long sideways hexagonal cross sectional shape as shown in FIG. 3. The cross sectional shape of the bead core 5 has a radially inner surface SL and radially outer surface SU which are inclined at from 10 to 17 degrees, more preferably at from 13 to 17 degrees, in this example almost 15 degrees with respect to the axial direction of the tire which corresponds to the inclination of the tapered bead seat J1 of the standard rim J. Further, the inner surface SL and the outer surface SU are connected in an axially inner surface Si and an axially outer surface so which are bent in an approximately center portion. The cross sectional shape of the bead core 5 may be a regular hexagonal shape, a rectangular shape or a circular shape as occasion demands.

A wrapping layer 12 is provided around the bead core 5 in each bead portion 4 so as to prevent the direct contact of the carcass cords with the bead wire 5w. The wrapping layer 12 is formed by a fabric, a non-woven fabric or a ply each made of organic fiber.

As shown in FIG. 3, the turnup portion 6b comprises a turnup main-part 10 being smoothly curved along the axially inner surface Si, the radially inner surface SL and the axially outer surface So of the bead core 5, and a turnup sub-part 11 extending from the turnup main-part 10 toward the main portion 6a near the radially outer surface SU of the bead core 5. In this embodiment, the turnup part 6b is bent in the shape of a circular arc smoothly without having a sharp corner part. This structure prevents deterioration of strength of the carcass cords.

The turnup sub-part 11 extends an outer region outside an extension line K obtained by extending the radially outer surface SU of the bead core 5. A distance between the outer surface of SU of the bead core 5 and the turnup sub-part 11 is gradually increased toward an end 11a of the turnup sub-part 11.

Further, a cushion rubber 13 is disposed between the turnup sub-part 11 and the outer surface SU of the bead core 5 in each bead portion 4. In this embodiment, the cushion rubber has a cross sectional shape of a triangle.

In order to prevent defective molding such that an air is left between the turnup sub-part 11 and the bead core 5 caused by returning of the sub-part 11, an angle theta of the turnup sub-part 11 with respect to the outer surface SU of the bead core 5 is preferably set not less than 10 degrees, and further preferably not less than 15 degrees. Further, in order to keep durability of the bead portion 4, the angle theta is preferably set not more than 60 degrees, further preferably not more than 45 degrees.

Figure 4:
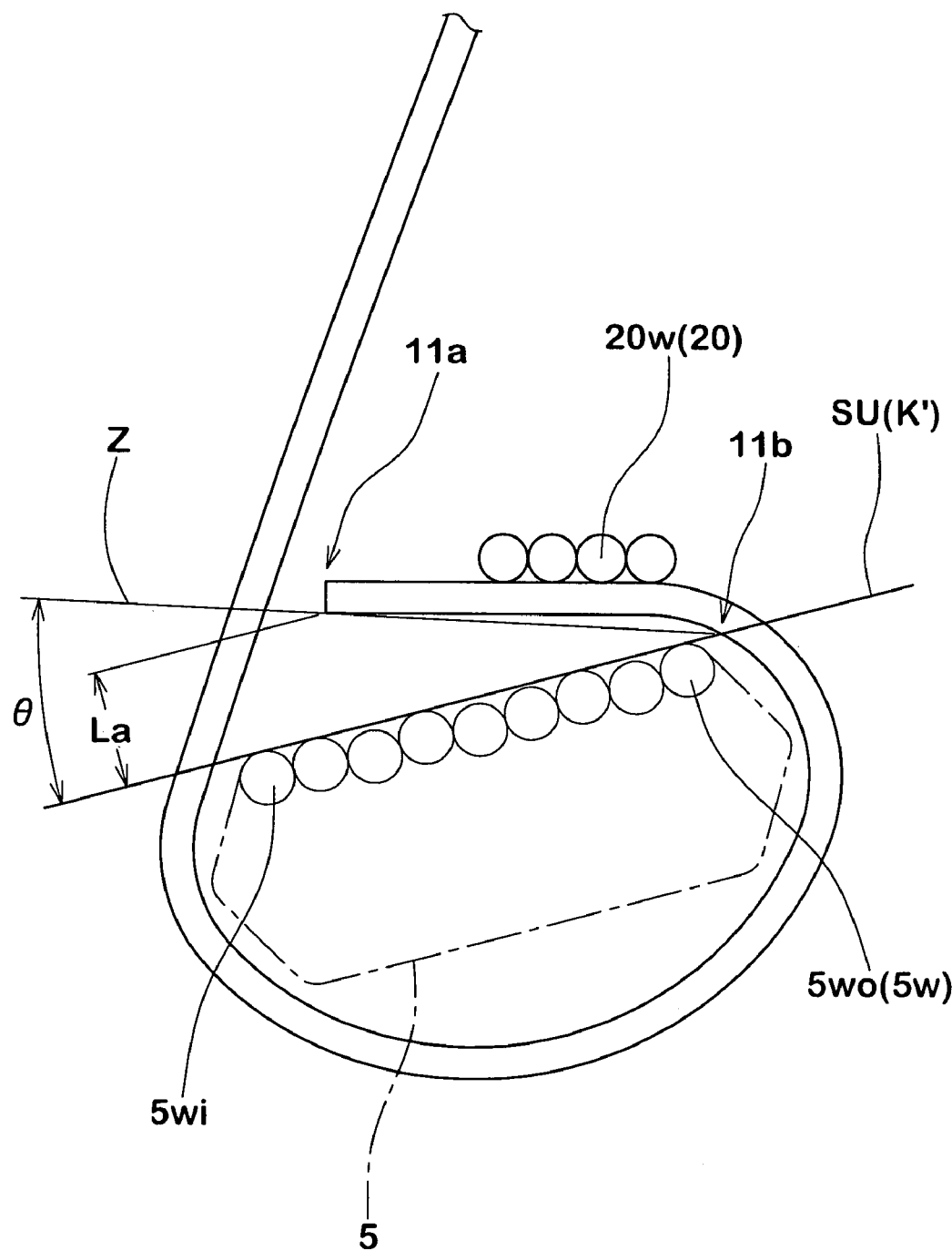
FIG. 4 is an another enlarged view of a bead portion.

Here, the angle theta, as shown in FIG. 4, is defined as an angle formed between the extension line K which is a tangent contacting on the bead wires 5w arranged in the outer surface of the bead core 5 and a straight line Z obtained by connecting an intersecting point 11b where the extension line K of the outer surface SU of the bead core 5 intersects with the turnup sub-part 11 and the outer end 11a thereof.

As shown in FIG. 4, when no common tangent is drawn in the bead wires 5w constituting the outer surface SU of the bead core 5, the angle theta is defined as an angle between the straight line Z and a extension line K' which is in contact with an outermost bead wires 5wo and an innermost bead wire 5wi in the outer surface SU of the bead core 5.

Figure 9A:
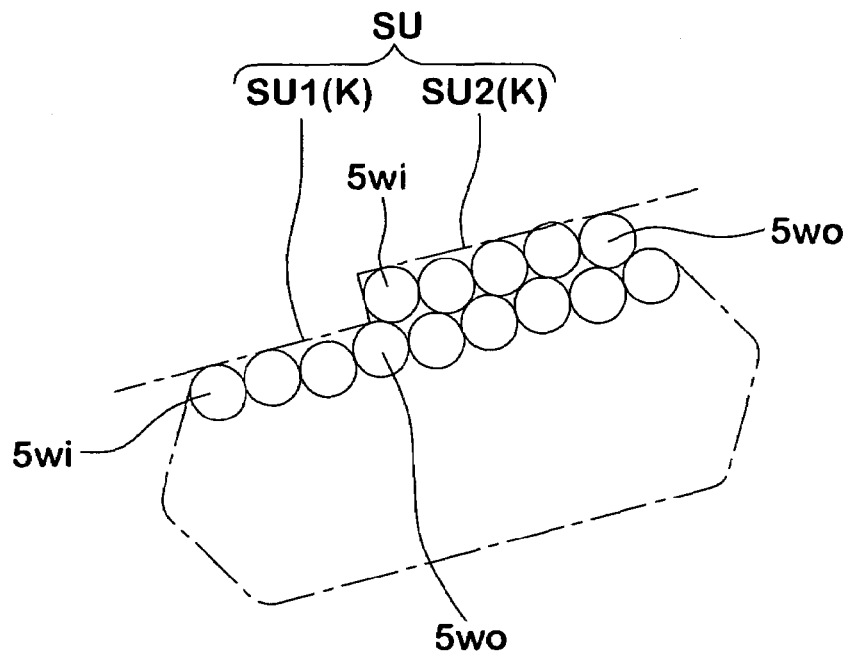
FIGS. 9(A) and 9(B) each are cross sectional view showing a bead core.

Further, as shown in FIG. 9(A), when the outer surface of the bead core 5 has a step, the extension line K is obtained on each surface SU1 and SU2.

In order to effectively prevent damage being generated from the outer end 11a of the turnup sub-part 11, a distance La between the end 11a of the turnup sub-part 11 and the extension line K of the bead core 5 is preferably set in the range of from 3 to 10 mm. If the distance La becomes too large, stress applied into the end 11a of the turnup sub-part 11 when bead portion 4 is bent becomes large.

Also, in order to prevent a cord loose of the carcass ply 6A, a distance "d" along the extension line K between the outer end 11a of the turnup sub-part 11 and the axially outermost edge 5e of the bead core 5 is preferably set not less than 5 mm. On the other hand, the outer end 11a of the turnup sub-part 11 is provided apart from the cord of the main portion 6a of the carcass ply 6A. Here, a distance Lb between the outer end 11a and a cord of the main portion 6a is preferably set not less than 1.0 mm.

The cushion rubber 13 has a complex modulus Ea* in the range of from 5 to 15 MPa, more preferably not less than 6 MPa, further preferably not less than 7 MPa, but preferably not more than 13 MPa, and more preferably not more than 11 MPa. The cushion rubber 13 can absorbs the vibration and the stress applied to the outer end 11a of the turnup sub-part 11, and improves a durability of the bead portion 4. When the complex modulus Ea* of the cushion rubber 13 is more than 15 MPa, a flexibility is deteriorated, and the cord loose tends to be generated in the outer end 11a of the turnup sub-part 11.

On the other hand, if the complex modulus Ea* of the cushion rubber 13 is less than 5 MPa, the strain of the outer end 11a of the turnup sub-part 11 becomes large. Here, the value of the complex modulus is measured by using a viscoelastic spectrometer under a condition of a temperature of 70 degree C., a frequency of 10 Hz and a dynamic strain rate of 2%.

In this embodiment, in order to retain the shape of the turnup sub-part 11 by preventing a spring back thereof, a hold band 20 is provided with radially outside the turnup sub-part 11. The hold band 20 is made of a cord 20w coated with a topping rubber being wound spirally at least one time, more preferably two to six times in substantially parallel to a circumferential direction of the tire.

As for the cord 20w of the hold band 20, a steel cord with a cord strength of from 2000 to 4000 N is suitable. If the cord strength is less than 2000N, many windings of the cord 20w may be required in order to keep the shape of the turnup sub-part 11. On the other hand, if the cord strength is more than 4000N, it may be hard to wind the cord on the turnup sub-part 11.

In order to improve the bead durability, a distance Lc between an axially inner edge of the hold band 20 and the outer end 11a of the turnup sub-part 11 is preferably set in the range of from 1 to 10 mm as shown in FIG. 3. If the distance Lc is less than 1 mm, the cord 20w of the hold band 20 tends to come off the turnup sub-part 11. Also, if the distance LC is more than 10 mm, a binding force applied to the turnup sub-part 11 by the hold band 20 becomes small.

As shown in FIG. 3, the bead core 5 has an aspect ratio (HC1/WC) of the maximum thickness HC1 to the maximum width WC of from 0.43 to 0.58. Here, the maximum thickness HC1 of the bead core 5 is a thickness between the outer surface SU and the inner surface SL of the bead core 5, and is measured in normal direction to the extension line K. Also, the maximum width WC of the bead core 5 is measured along the extension line K. Such a bead core 5 with a low aspect ratio generates a great resistance force to prevent a rotation thereof around the center of the cross sectional shape caused by the tension of the main portion of the carcass ply 6A.

Figure 5:
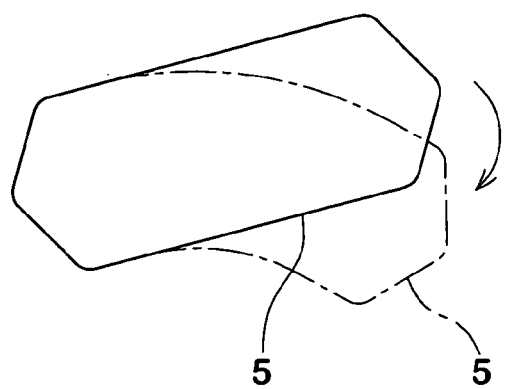
FIG. 5 is a cross sectional view of a bead core.

If the aspect ratio of the bead core 5 is more than 0.58, it is hard to prevent the rotation of the bead core 5 around the center point of the cross sectional shape without enlarging the area of the cross section of the bead core 5. On the other hand, if the aspect ratio is less than 0.43, such a bead core has a low strength and tends to deform into an irregular shape as shown in FIG. 5. With this deformation of the bead core 5, large deformation of the bead portion 4 tends to be generated. In this point of view, the aspect ratio (HC1/WC) of the bead core 5 is preferably set in the range of from 0.50 to 0.58.

Figure 6:
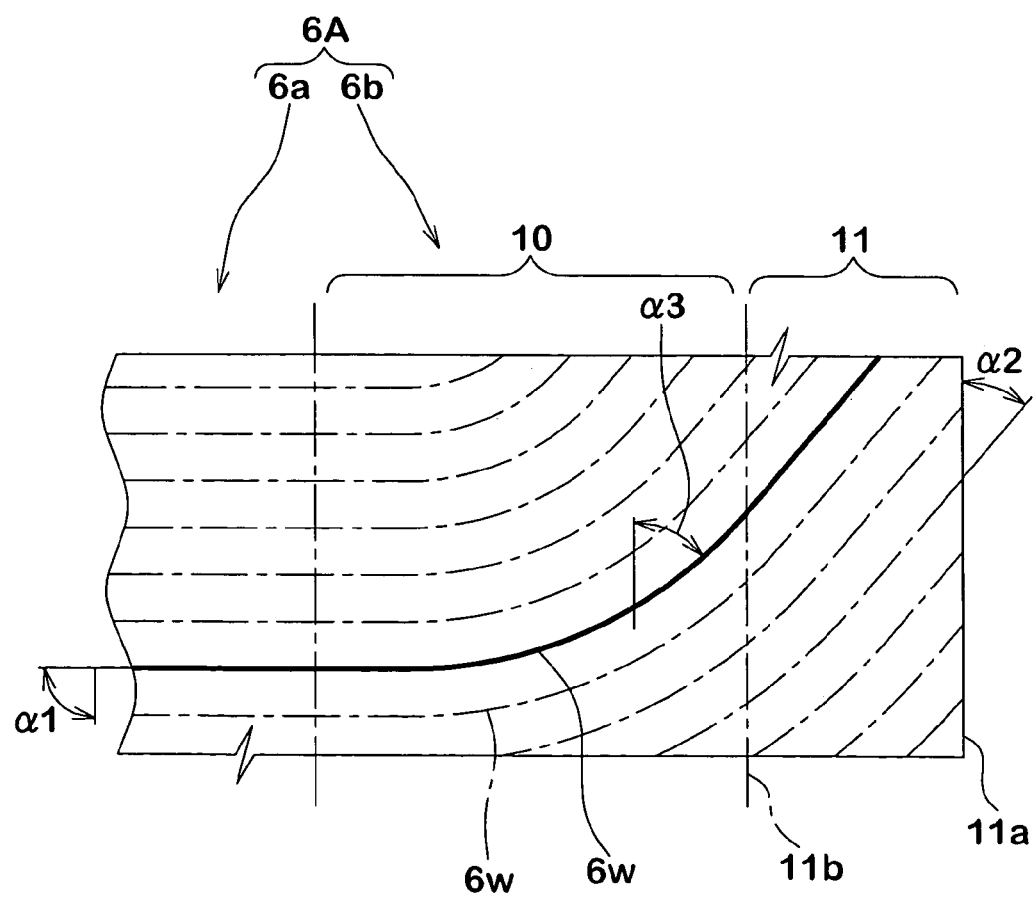
FIG. 6 is a plan view of a carcass ply developed on a plan.

In order to prevent such a deformation of the bead core 5, the turnup sub-part 11 has the carcass cords arranged at an angle alpha 2 of 40 to 70 degrees with respect to the circumference direction of the tire, although the main portion 6a has the carcass cords arranged at an angle alpha 1 of 80 to 90 degrees with respect to the circumference direction of the tire, as shown in FIG. 6. That is, the angle with respect to the circumferential direction of the carcass cord extending from the main portion 6a to turnup sub-part 11 continuously is varying at least 10 degrees or more.

In this present invention, although the angle alpha 2 of each carcass cord of the turnup sub-part 11 is substantially constant, it can be varying within the range of from 40 to 70 degrees. For example, it is desirable that the angle alpha 2 is gradually increased toward the outer end 11a of the turnup sub-part 11.

This turnup sub-part 11 makes it possible to reduce a moment to rotate the bead core 5 around the center point of the cross section thereof. For example, the moment can be reduced about cosine (alpha 2) times compared with a tire having a turnup sub-part 11 with carcass cords arranged at an angle of 90 degrees with respect to the circumferential direction of the tire. Therefore, the heavy duty tire in accordance with the embodiment can prevent the deformation of the bead core 5.

Here, when the angle alpha 2 is more than 70 degree, it is hard to prevent the deformation of the bead core 5. On the other hand, when the angle alpha 2 is less than 40 degrees, it tends to increase a cost since a length of the carcass cord is enlarged.

The turnup main-part 10 has the carcass cords arranged at an angle alpha 3 which is gradually varying from the alpha 1 to alpha 2 with respect to the circumferential direction of the tire. In each bead portion 4, the carcass cords 6w of the turnup portion 6b are inclined in the same direction with respect to the circumferential direction of the tire.

In this embodiment, a bead reinforcing layer 15 is provided with in each bead portion 4. The bead reinforcing layer 15 comprises at least one reinforcing ply 15A of steel cords arranged at angle of from 15 to 60 degrees with respect to the circumferential direction of the tire.

Figure 2:
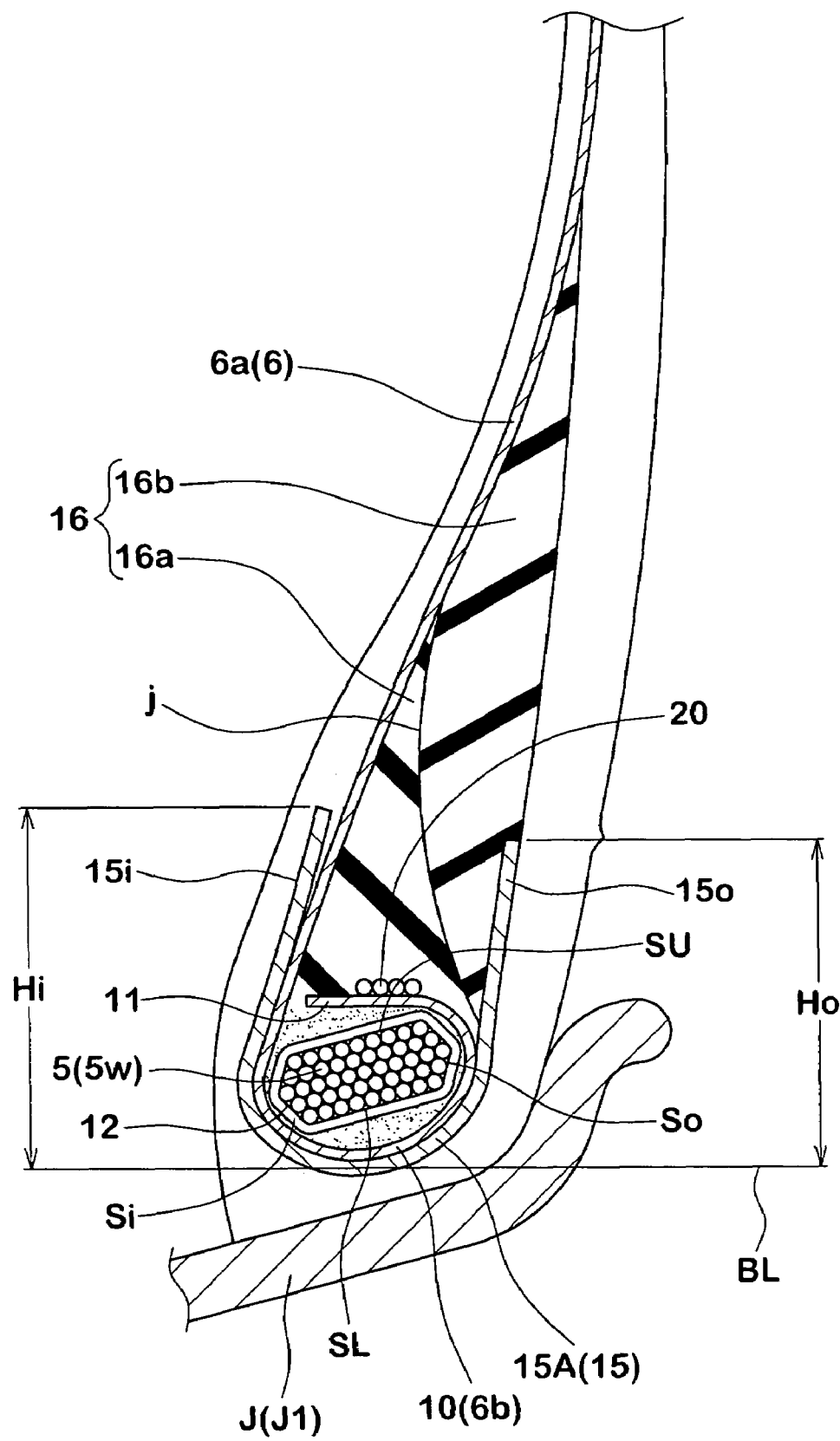
FIG. 2 is an enlarged view of FIG. 1.

As shown in FIG. 2, the reinforcing ply 15A comprises a center portion 15A, an outside portion 15o and an inside portion 15i so as to form a "U" shape in the tire cross section including a tire axis. The center portion 15A is curved along the turnup main-part 10 and extends along the radially inside thereof. The outside portion 15o extends toward radially outside from the center portion 15A and apart from the turnup sub-part 11. The inside portion 15i extends from the center portion 15A toward radially outside and along an inside of the main portion 6a of the carcass ply 6A.

An inclined direction of the steel cord in the reinforcing ply 15A is different from the inclined direction of the carcass cords 6w in the turnup portion 6b. Therefore, it is possible to reduce the rotation and the deformation of the bead core 5 by increasing the rigidity around the bead core 5.

The outside portion 15o of the reinforcing ply 15 can prevent heat transferring from a brake pad (not shown) or the like via the rim J to a rubber with in the bead portion 4. Therefore, it is desirable that a radial height Ho of the outside portion 15o from a bead base line BL of the tire 1 to an outer end thereof is preferably set not less than 25 mm. On the other hand, if the height Ho is too large, some damages such as separation or the like tend to be generated at the end of the outside portion 15o. Therefore, the height Ho is preferably not more than 55 mm.

Further, in order to reduce a stress applied to the outer end of the outside portion 15o, it is desirable that a radial height Hi of the inside portion 15i from the bead base line BL to an outer end thereof is larger than the height Ho of the outside portion 15o. Especially, the difference (Hi−Ho) between the height Hi and Ho is preferably not less than 2 mm. On the other hand, if the height Hi is too large, some damages such as separation or the like tend to be generated at the end of the inside portion 15i. Therefore, the height Hi is preferably not more than 57 mm.

In this present embodiment, a bead apex 16 is disposed radially outside the turnup sub-part 11 in each bead portion 4. The bead apex 16 extends and tapers radially outwardly from the turnup sub-part 11.

The bead apex 16 in accordance with the present embodiment comprises an inner apex 16a which is arranged in the inner side in the tire radial direction, and an outer apex 16b which is arranged in an outer side of the inner apex 16a. In the bead apex 16, a boundary line J between the inner apex 16a and the outer apex 16b extends from near the inner end of the turnup sub-part 11 to the main portion 6a of the carcass ply 6A.

In order to improve the durability of the bead portion 4, a complex modulus E*b of the inner apex 16a is preferably not less than 20 MPa, more preferably not less than 25 MPa, further preferably not less than 30 MPa, but preferably not more than 70 MPa, more preferably not more than 65 MPa, and further preferably not more than 60 MPa.

Further, in order to improve the durability of the bead portion 4, the outer apex 16b has a complex modulus E*c smaller than the inner apex 16a. Especially, the complex modulus E*c is preferably not less than 3.0 MPa, more preferably not less than 3.5 MPa, but preferably not more than 7.0 MPa, more preferably not more than 5.0 MPa. When the complex modulus E*c of the outer apex 16b is less than 3.0 MPa, some cracks tend to be generated at the boundary between the inner apex 16a and the outer apex 16b. On the other hand, when the complex modulus E*c of the outer apex 16b is more than 7.0 MPa, a separation tends to be generated at the outer end of the outer apex 16b.

Figure 7:
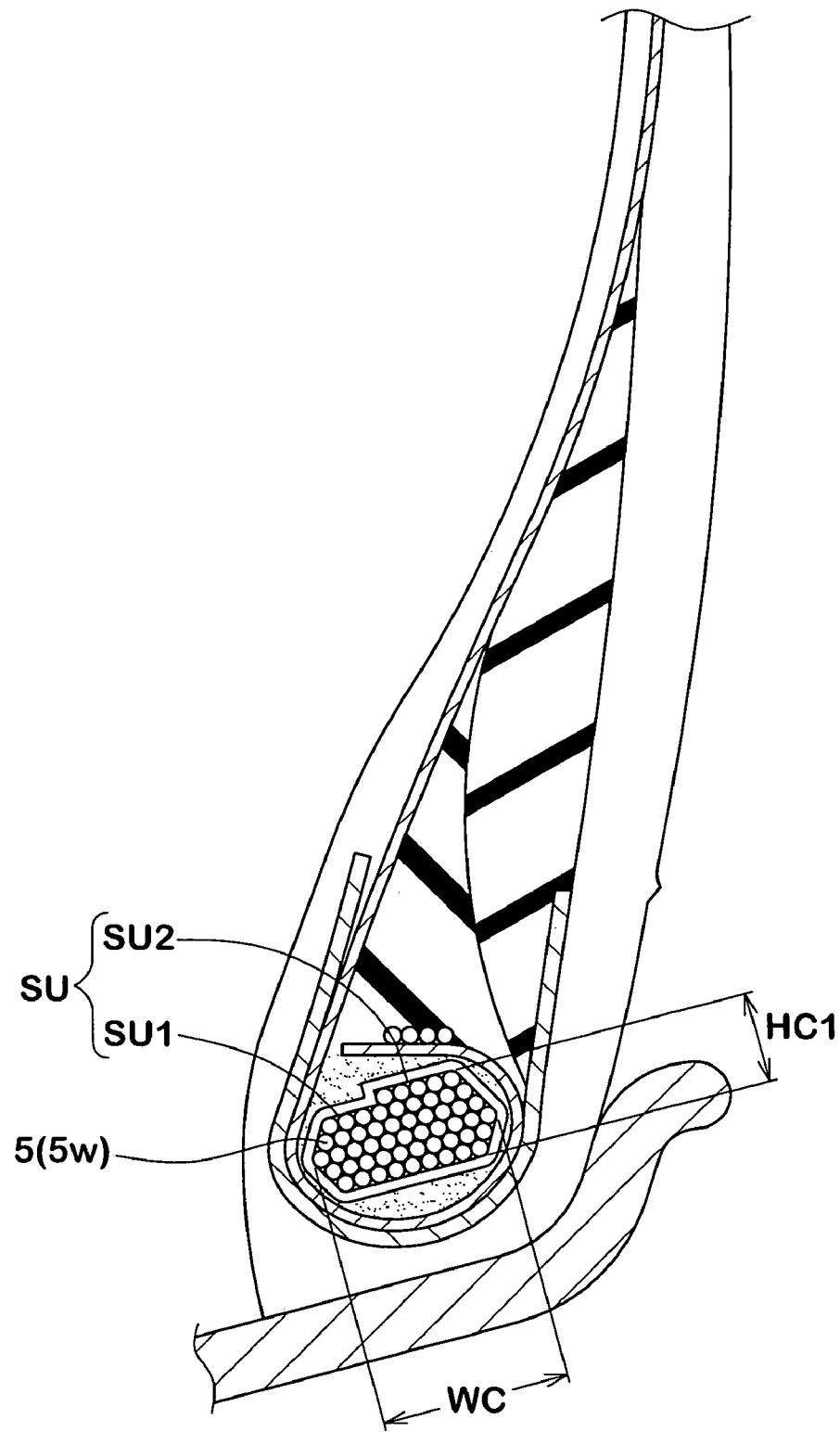
FIG. 7 is a cross sectional view of an another embodiment of a heavy duty tire in accordance with the present invention.
Figure 8:
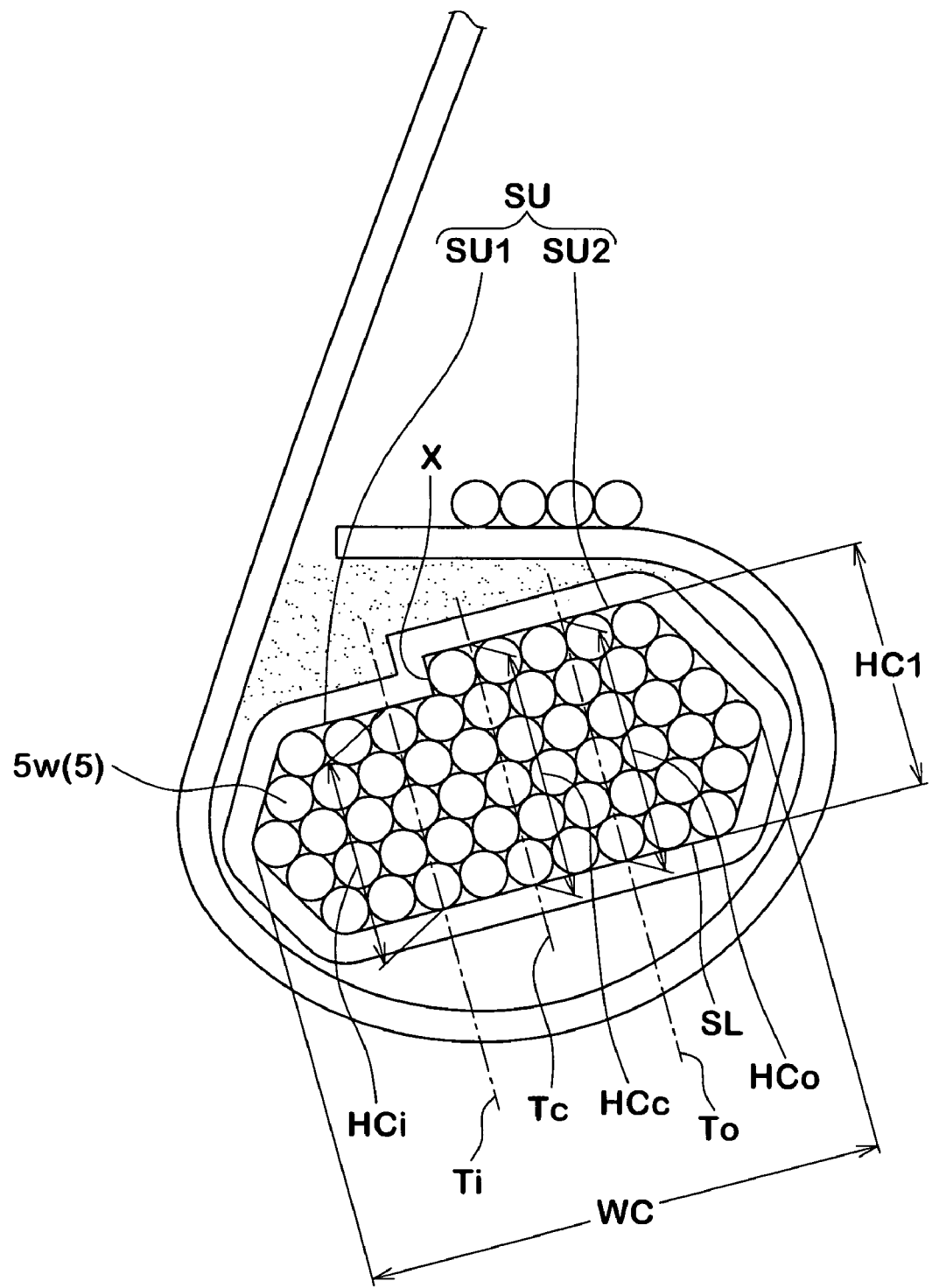
FIG. 8 is an enlarged view of FIG. 7.

As shown in FIGS. 7 and 8, in order to prevent the deformation of the bead core 5, it is desirable that the bead core 5 has an axially inner thickness HCi and axially outer thickness HCo, and the axially outer thickness HCo is the maximum thickness of the bead core 5 and thicker than the inner thickness HCi. Here, the thicknesses HCi and HCo are thicknesses at two positions Ti and To which divide the maximum width of the bead core 5 into equal three parts as shown in FIG. 8.

In this embodiment, the radially outer surface SU of the bead core 5 has a step comprising: an axially inner part SU1; a step part x extending from the inner part SU1 vertically with respect to the inner part SU1; and an axially outer part SU2 extending from the radially outer end of the step part x in parallel with the inner part SU1. The radially inner surface SL of the bead core 5 has a flat shape. With this, the outer portion of the bead core 5 with the thickness of HCo has large strength compared with the inner portion of the bead core 5 with the thickness HCi.

Since the moment tends to apply into the outer portion of the bead core 5 too much via the turnup sub-part 11, such a bead core 5 can achieve a great resistance against the deformation thereof. Therefore, the step part x is preferably provided between the positions Ti and a position Tc which divides the maximum width of the bead core 5 into equal two parts.

Figure 9B:
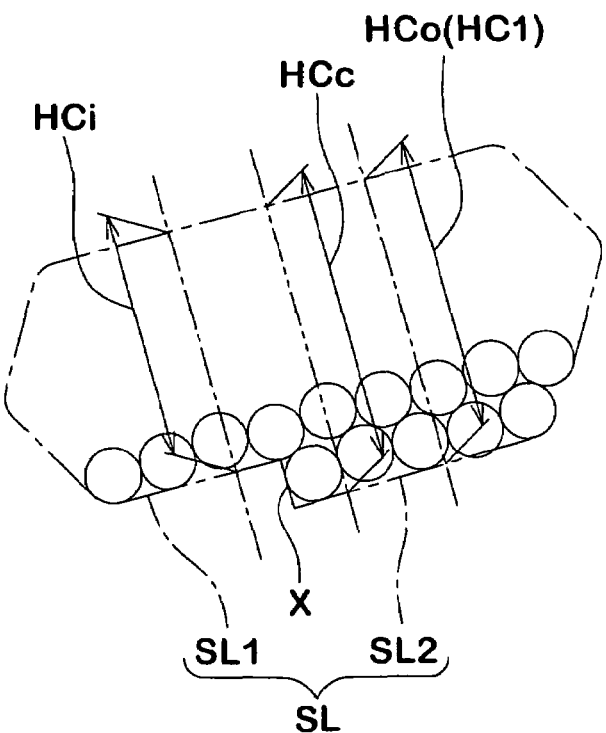

Further, as shown in FIG. 9(B), the radially inner surface SL of the bead core 5 has a step comprising: an axially inner part SL1; a step part x extending from the inner part SL1 vertically with respect to the inner part SL1; and an axially outer part SL2 extending from the radially inner end of the step part x in parallel with the inner part SL1. The radially outer surface SU of the bead core 5 has a flat shape.

Comparison Test

Figure 10:
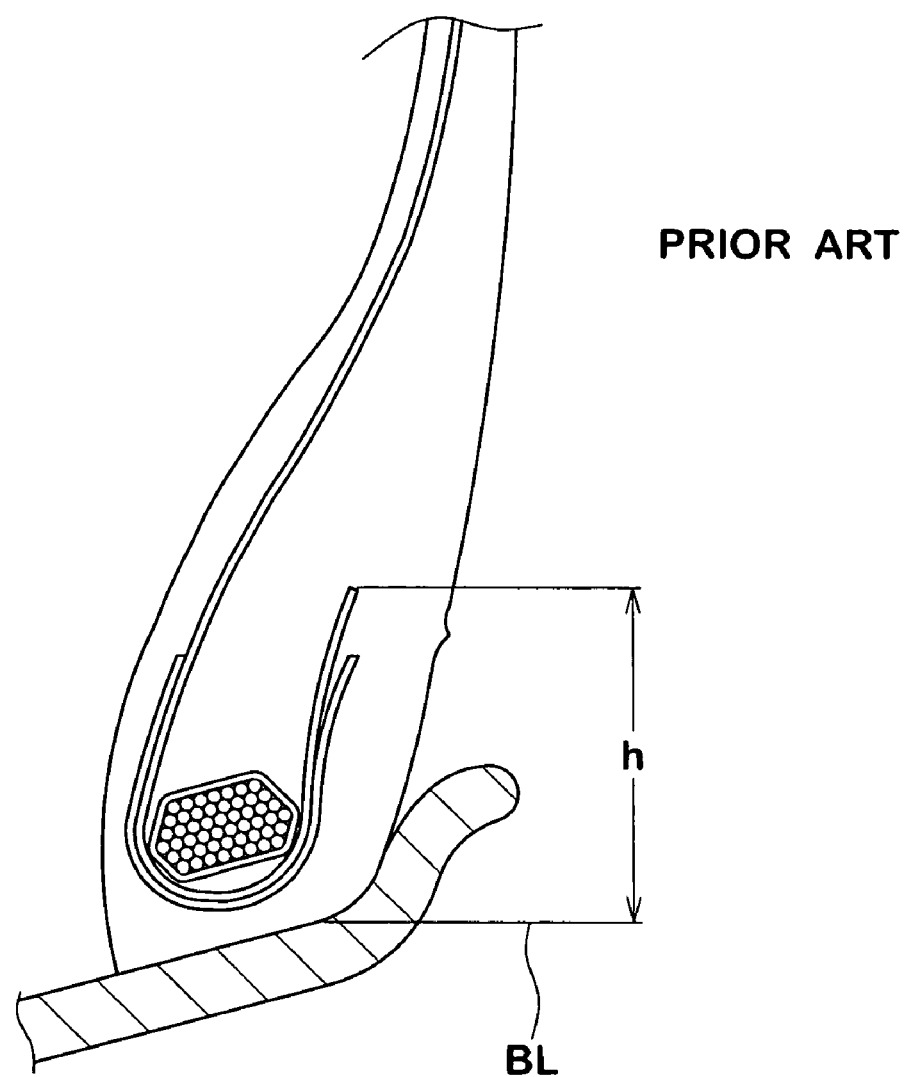
FIG. 10 is a cross sectional view of a bead portion of a prior art.
Figure 11:
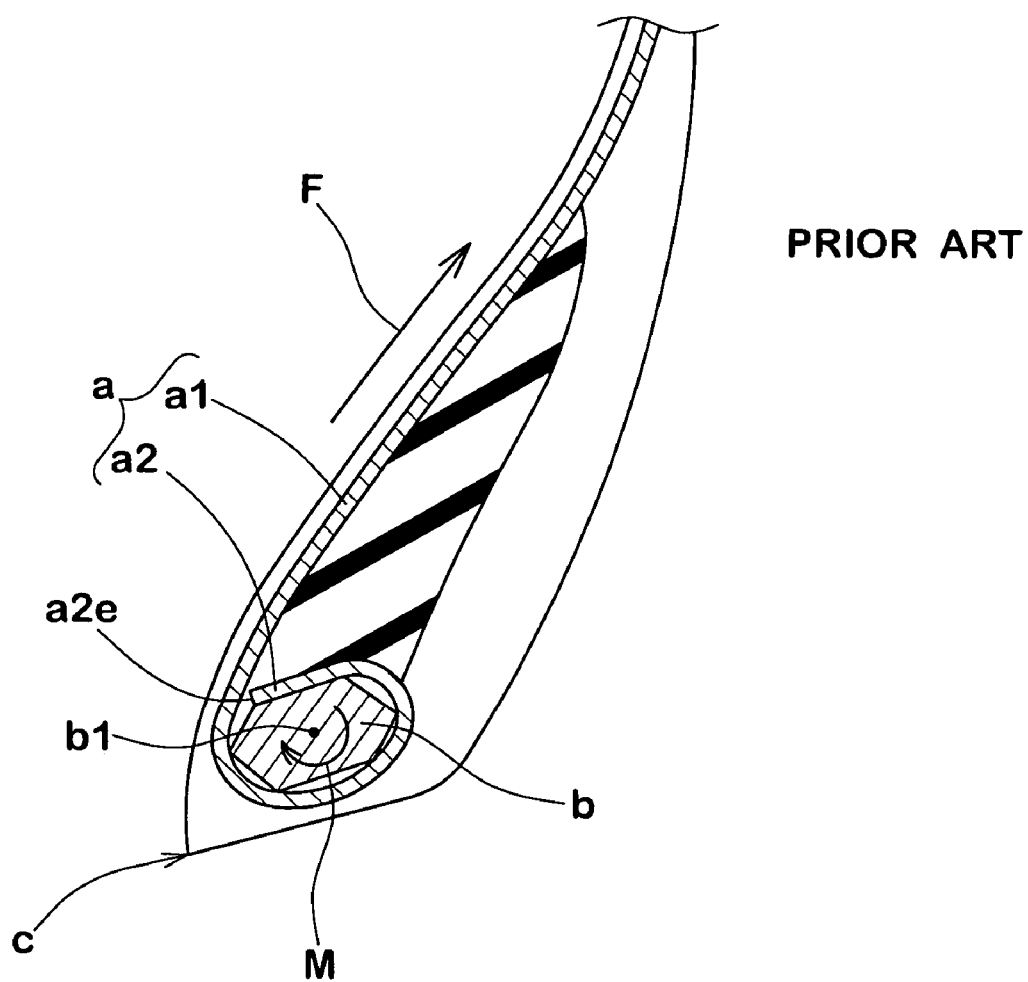
FIG. 11 is a cross sectional view of a bead portion of a prior art.

Radial heavy duty tires of a size 11R22.5 were manufactured by way of trial on the basis of the specification in Table 1, and tested performances as follows. Other specs of the tires not listed in Table 1 are the same. Also, a tire of reference 1 has a carcass ply as shown in FIG. 10, and the radial height h of the turnup portion is 37 mm.

Inflation Test:

First, each new tire was mounted on a rim of 7.50×22.5 with an inner pressure of 700 kPa. Next, the assembly of the tire and rim was placed in a atmosphere of 80 degrees C. for three days. Finally, the tire was removed from the rim, and then each tire was re-mounted on the rim and filled air into it up to the pressure of 700 KPa. And the ease of carrying out of air filling was evaluated.

Bead Core Strength:

After the inflation test mentioned, each tire was taken a X ray photograph, and the deformation and the rotation of the bead core were checked from the photograph. To evaluate the rotation of the bead core, a difference angle between the radially outer surface of the bead core of new tire and old one was measured. An evaluation of the rotation of the bead core is indicated by an index obtained by setting a reciprocal of the difference angle in the reference to 100. The larger the numeric value is, the more excellent resistance against the rotation is.

Bead Durability 1 (General Bead Durability)

A drum testing machine is used, and a running time until damage is generated in the bead portion under the following condition is measured.

Rim: 7.50×22.5

Internal pressure: 700 kPa

Vertical load: 27.25 kN×3

Speed: 20 km/h

An evaluation is indicated by an index obtained by setting a running time in the reference—1 to 100. The larger the numeric value is, the more excellent the durability is.

Bead Durability 2 (Heat Bead Durability):

The general bead durability test mentioned above is executed under a state of heating the rim at 130 degrees C., and a running time until damage is generated in the bead portion is measured. An evaluation is indicated by an index obtained by setting the reference—1 to 100.

Results of tests and the like are shown in Table 1.

|  | Ex. 1 | Ex. 2 | Ex. 3 | Ex. 4 | Ref. 1 | Ref. 2 | Ref. 3 | Ref. 4 | Ex. 5 | Ref. 5 |
|---|---|---|---|---|---|---|---|---|---|---|
| Bead Structure | FIG. 2 | FIG. 2 | FIG. 2 | FIG. 2 | FIG. 10 | FIG. 2 | FIG. 2 | FIG. 2 | FIG. 2 | FIG. 2 |
| Carcass Cord Angle |  |  |  |  |  |  |  |  |  |  |
| Alpha1 [deg] | 90 | 90 | 90 | 90 | 90 | 90 | 90 | 90 | 90 | 90 |
| Alpha2 [deg] | 50 | 65 | 90 | 90 | 90 | 90 | 90 | 80 | 90 | 90 |
| Distance |  |  |  |  |  |  |  |  |  |  |
| La [mm] | 6 | 6 | 8 | 6 | — | 6 | 6 | 6 | 6 | 6 |
| d [mm] | 12 | 12 | 12 | 12 | — | 12 | 12 | 12 | 12 | 12 |
| Hold band | Applied | Applied | Applied | Applied | Not Applied | Applied | Applied | Applied | Applied | Applied |
| Cord winding Num. | 4 | 4 | 4 | 4 | — | 4 | 4 | 4 | 4 | 4 |
| Cushion Rubber | Applied | Applied | Applied | Applied | Not Applied | Applied | Applied | Applied | Applied | Applied |
| Complex Modulus [MPa] | 7.0 | 7.0 | 7.0 | 7.0 | — | 7.0 | 7.0 | 7.0 | 7.0 | 7.0 |
| Bead Reinforcing Layer | Applied | Applied | Applied | Applied | Applied | Applied | Applied | Applied | Applied | Applied |
| Height Hi [mm] | 34 | 34 | 34 | 34 | 55 | 34 | 34 | 34 | 34 | 34 |
| Height Ho [mm] | 31 | 31 | 31 | 31 | 27 | 31 | 31 | 31 | 31 | 31 |
| Bead Core |  |  |  |  |  |  |  |  |  |  |
| Number of wire in Cross Section | 49 | 49 | 54 | 53 | 51 | 49 | 51 | 49 | 57 | 54 |
| Section spec (*) | 9 * 10 * 11 * 10 * 9 | 9 * 10 * 11 * 10 * 9 | 9 * 10 * 11 * 10 * 9 * 5 | 4 * 9 * 10 * 11 * 10 * 9 | 8 * 9 * 10 * 9 * 8 * 7 | 9 * 10 * 11 * 10 * 9 | 8 * 9 * 10 * 11 * 10 * 9 * 8 * 7 | 9 * 10 * 11 * 10 * 9 | 9 * 10 * 11 * 10 * 9 * 8 | 10 * 11 * 12 * 11 * 10 |
| Thickness Relation | Hci = Hco | Hci = Hco | Hci < Hco | Hci < Hco | Hci = Hco | Hci = Hco | Hci = Hco | Hci = Hco | Hci = Hco | Hci = Hco |
| Aspect Ratio(HC1/WC) | 0.45 | 0.45 | 0.55 | 0.55 | 0.60 | 0.45 | 0.60 | 0.45 | 0.55 | 0.42 |
| Inflation Test | Good | Good | Good | Good | Good | Not Good | Not Good | Not Good | Good | Not Good |
| Bead core strength |  |  |  |  |  |  |  |  |  |  |
| Rotation Resistance | 100 | 100 | 100 | 100 | 100 | 100 | 95 | 100 | 100 | 100 |
| Deformation Resistance | Good | Good | Good | Good | Good | Not Good | Not Good | Not Good | Good | Not Good |
| Bead Durability1 (GeneralDurability) | 130 | 130 | 130 | 130 | 100 | 130 | 130 | 130 | 130 | 130 |
| Bead Durability2 (HeatDurability) | 110 | 110 | 110 | 110 | 100 | 110 | 110 | 110 | 110 | 110 |

(*) The number of wires of each line of the bead core is shown from the inner side of tire radial direction.

For example, the spec of bead core of FIG. 3 is expressed with 9×10×11×10×9.

The invention claimed is:

1. A heavy duty tire comprising:
    a tread portion;
    a pair of sidewall portions;
    a pair of bead portions each having a bead core therein,
        the bead core having an aspect ratio (HC1/WC) of the maximum thickness HC1 to the maximum width WC of from 0.43 to 0.58,
        the bead core having an axially inner thickness HCi and axially outer thickness Hco at the positions which divide the maximum width of the bead core into equal three parts, the axially outer thickness Hco being the maximum thickness and thicker than the axially inner thickness Hci, the bead core formed by winding a bead wire to form a substantially hexagonal cross sectional shape having a radially inner surface, and the radially inner surface of the bead core consisting of an axially inner part extending at angle of from 10 to 17 degrees with respect to the axial direction of the tire, an axially outer part extending substantially in parallel with the inner part and located radially outside of the axially inner part, and a step part connecting between the axially inner part and outer part to form one step; and a carcass comprising a carcass ply of cords extending between the bead portions and turned up around the bead core in each bead portion from the inside to outside of the tire so as to form a pair of turnup portions and a main portion there between, the turnup portion comprising a turnup main-part extending along an axially inner surface, a radially inner surface and an axially outer surface of the bead core smoothly, and a turnup sub-part extending from the turnup main-part toward the main portion near the radially outer surface of the bead core.

2. The heavy duty tire according to claim 1, wherein a cushion rubber is disposed between the turnup sub-pad and the bead core, and the cushion rubber has a complex modulus E*a of from 5 to 15 MPa.

3. The heavy duty tire according to claim 1, wherein
the cords of the main portion are arranged at an angle of from 80 to 90 degrees with respect to a circumferential direction of the tire, and
the cords of the turnup sub-part are arranged at an angle of from 40 to 70 degrees with respect to the circumferential direction of the tire.

4. The heavy duty tire according to claim 1, wherein
the bead portion is provided with a hold band disposed radially outside the turnup sub-part, and
the hold band is made of a steel cord being wound spirally in substantially parallel to a circumferential direction of the tire.

5. The heavy duty tire according to claim 1, wherein the bead portion is provided with a bead reinforcing layer comprising at least one reinforcing ply of cords, and the reinforcing ply including
a center portion extending along the radially inside surface the turnup main-part,
an axially outside portion extending from the center portion to the radially outside of the tire apart from The turnup portion, and
an axially inside portion extending from the center portion to the radially outside of the tire through the inside of the main portion.

6. The heavy duty tire according to claim 5, wherein
the axially outside portion has a height (Ho) from a bead base line of the tire to the outer edge of the outer portion of not less than 25 mm, and
the axially inside portion has a height (Hi) larger than the height (Ho).

7. The heavy duty tire according to claim 1, wherein the aspect ratio (HC1/WC) of the bead core is in the range of from 0.50 to 0.58.

8. The heavy duty tire according to claim 1, wherein
a pair of bead apexes is disposed radially outside the turnup sub-part in each bead portion,
the bead apex extends and tapers radially outwardly from the turnup sub-part,
each bead apex comprises an inner apex having a complex modulus E*b of from 20 to 70 MPa, an outer apex having a complex modulus E*c of from 3.0 to 7.0 MPa, and
a boundary between the inner apex and the outer apex extending radially outwardly from near the inner end of the turnup sub-part to the main portion of the carcass ply.

9. A heavy duty tire comprising:
a tread portion;
a pair of sidewall portions; and
a pair of bead portions each having a bead core therein,
the bead core having an aspect ratio (HC1/WC) of the maximum thickness HC1 to the maximum width WC of from 0.43 to 0.58,
the bead core having an axially inner thickness HCi and axially outer thickness HCo at the positions which divide the maximum width of the bead core into equal three parts,
the axially outer thickness HCo being the maximum thickness and thicker than the axially inner thickness HCi,
the bead core formed by winding a bead wire to form a substantially hexagonal cross sectional shape having a radially inner surface, and
the radially inner surface of the bead core consisting of an axially inner part extending at angle of from 10 to 17 degrees with respect to the axial direction of the tire, an axially outer part extending substantially in parallel with the inner part and located radially outside of the axially inner part, and a step part connecting between the axially inner part and outer part to form one step.

10. The heavy duty tire according to claim 9, wherein the aspect ratio (HC1/WC) of the bead core is in the range of from 0.50 to 0.58.

* * * * *